(12) United States Patent
Miner et al.

(10) Patent No.: US 8,032,651 B2
(45) Date of Patent: *Oct. 4, 2011

(54) NEWS ARCHITECTURE FOR ITV

(75) Inventors: Edward A Miner, Mill Valley, CA (US); Mark O Knowles, Fairfax, CA (US); Maikhanh T Nguyen, San Francisco, CA (US); Alison N Crakes-Franzen, Novato, CA (US)

(73) Assignee: TV Works, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/684,439

(22) Filed: Jan. 8, 2010

(65) Prior Publication Data

US 2010/0161826 A1 Jun. 24, 2010

Related U.S. Application Data

(63) Continuation of application No. 10/410,023, filed on Apr. 8, 2003, now Pat. No. 7,668,963, which is a continuation-in-part of application No. 09/841,017, filed on Apr. 23, 2001, now Pat. No. 7,702,995.

(60) Provisional application No. 60/371,747, filed on Apr. 10, 2002, provisional application No. 60/199,686, filed on Apr. 24, 2000.

(51) Int. Cl.
*G06F 15/16* (2006.01)

(52) U.S. Cl. ......... 709/231; 709/230; 709/236; 709/246

(58) Field of Classification Search .................. 709/230, 709/231, 236, 246
See application file for complete search history.

(56) References Cited

U.S. PATENT DOCUMENTS

| | | |
|---|---|---|
| 5,819,269 A | 10/1998 | Uomini |
| 6,430,624 B1 | 8/2002 | Jamtgaard et al. |
| 6,473,609 B1 | 10/2002 | Schwartz et al. |
| 6,473,858 B1 | 10/2002 | Shimomura et al. |
| 6,546,488 B2 | 4/2003 | Dillon et al. |
| 6,564,251 B2 | 5/2003 | Katariya et al. |
| 6,564,263 B1 | 5/2003 | Bergman et al. |
| 6,675,350 B1 | 1/2004 | Abrams et al. |
| 6,742,043 B1 | 5/2004 | Moussa et al. |
| 6,745,368 B1 | 6/2004 | Boucher et al. |
| 6,826,597 B1 | 11/2004 | Lonnroth et al. |
| 6,847,969 B1 | 1/2005 | Mathai et al. |
| 7,222,163 B1 | 5/2007 | Girouard et al. |
| 7,287,018 B2 | 10/2007 | Lennon |
| 7,500,188 B1 * | 3/2009 | Trapani et al. ............... 715/273 |
| 2004/0006747 A1 | 1/2004 | Tyler |
| 2005/0114757 A1 * | 5/2005 | Sahota et al. ............. 715/501.1 |
| 2010/0268773 A1 * | 10/2010 | Hunt et al. .................... 709/203 |

* cited by examiner

*Primary Examiner* — Phuoc Nguyen
(74) *Attorney, Agent, or Firm* — Banner & Witcoff, Ltd.

(57) ABSTRACT

A system and method for acquiring media content is disclosed. A capture platform may allow users to create customized templates for the automatic capture of web-based media, such as news. Captured content may be normalized for optimized access by a plurality of different device platforms, and may also be customized for individual users. One or more chained transformer plug-ins may be used to provide the customization.

20 Claims, 4 Drawing Sheets

NEWS ARCHITECTURE FOR ITV

RELATED APPLICATIONS

This application is a continuation of U.S. application Ser. No. 10/410,023, entitled "NEWS ARCHITECTURE FOR ITV", filed Apr. 8, 2003, which claims the priority benefit of U.S. Provisional Application 60/371,747, entitled "NEWS ARCHITECTURE FOR ITV", filed Apr. 10, 2002 and assigned to the assignee of the present invention, and which is also a Continuation-in-Part of U.S. patent application Ser. No. 09/841,017, entitled "METHOD AND SYSTEM FOR TRANSFORMING CONTENT FOR EXECUTION ON MULTIPLE PLATFORMS", filed Apr. 23, 2001, which claims priority to U.S. Provisional Application 60/199,686 entitled, "METHOD AND SYSTEM FOR TRANSFORMING CONTENT FOR EXECUTION ON MULTIPLE PLATFORMS," filed on Apr. 24, 2000.

The complete disclosures of all of the above-cited applications are hereby incorporated herein by reference.

FIELD OF THE INVENTION

The present invention relates to automated harvest and delivery of information content from a news (e.g., a network news transport protocol or NNTP) data source to a variety of applications including interactive television (iTV) applications that may execute on a set-top box.

BACKGROUND OF THE INVENTION

In the above-cited U.S. patent application Ser. No. 09/841,017, a method and system for acquiring and transforming existing content (e.g., Hyper Text Markup Language (HTML) content) for display and execution on multiple platforms and architectures were disclosed. In one embodiment, capture templates were created to harvest content from disparate content sources on multiple platforms. Data was then extracted from the disparate content sources using the created capture templates and a standardized data stream was generated from the extracted data. The standardized data stream was ultimately provided for display on one or more different type of platforms, such as a fit television set. These processes were enabled through the use of a syndication server more fully described in the '017 application.

For those readers not familiar with the '017 applications, syndication is a process of gathering information from a range of sources and repackaging the information for access and display at a destination. Syndication is popular with interactive television (iTV) environments, in which a viewer can interact with a broadcast or service being provided on the TV. The '017 application described in detail how to syndicate many types of content, and in particular HTML content, for such iTV applications.

HTML is not, however, the only form of content accessible to Internet users. Another popular form of content is news data, often formatted according to the so-called network news transport protocol (NNTP). In the past, NNTP data was received directly from a news- (NNTP-) based source and presented to the user directly through Java Server Pages/Servlets. Manipulation of data into a preferred display format was implemented on a page-by-page basis through hand coding.

Because multiple person teams (as opposed to just individuals) typically create software applications, this structure for obtaining NNTP data in preferred formats increases the possibility for inserting individualized (non-standard) coding techniques and duplication of code. This leads to issues with product supportability, scalability and maintainability. In addition, individualized application architectures make various processing tasks, such as error handling, much more difficult as new error handling processes would need to be implemented across each application instantiation.

Thus,
a. Prior approaches that address the gathering and provision of news content consist of custom-written programs or scripts to integrate news feeds from outside news (NNTP) sources.
b. These approaches use one program or script for each page to acquire and convert the content and assets and require programmer-level knowledge to perform the conversions.
c. These prior approaches are not designed to be a holistic system—rather, they provide a problem solution on a page-by-page basis.

SUMMARY OF THE INVENTION

A method and system for acquiring and transforming existing news content for display on multiple platforms and architectures. In one embodiment, capture templates are created to harvest the news content from disparate content sources on multiple platforms. The news data is extracted from the content sources using the created capture templates and a normalized data stream is generated therefrom. The normalized data stream is provided for display on the different type of platforms and may be cached for later transmission upon request.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Described herein are a method and system are described for defining and integrating custom news (e.g., NNTP) feeds from any news- (NNTP-) based source, (including traditional text/ASCII-based feeds as well as Multipurpose Internet Mail Extensions (MIME) enhanced feeds) for display and execution on multiple platforms and architectures according to a syndication process. In one embodiment, capture templates are created to harvest the news content from disparate content sources on multiple platforms. News data is extracted from the disparate content sources using the created capture templates. A standardized data stream is generated from the extracted news data and is provided for display on one or more different type of platforms. One implementation of the present invention exists in MetaTV's (the assignee of the present invention) architecture for extracting and displaying content of various data types from a news data source via NNTP on an iTV medium By generating a standardized data stream from the capture templates, content can be displayed on multiple types of platforms. The capture templates are platform neutral and allow content to be portable on or more different types of platforms. The capture templates are used to transform content for different types of devices. Thus, by using such capture templates, content does not have to be re-coded for each specific type of device or platform.

In one embodiment, a capture template is an Extensible Markup Language (XML) file or document that is created by extracting data from HTML content. The XML file allows for portability of data across multiple platform types. Because XML is extensible, content can be defined in a number of ways for many different purposes. Thus, new "look and feel" content can be created. In one embodiment, a simple to use template authoring tool allows XML files to be created by selectively navigating and extracting data from HTML content. The template authoring tool enables a user to create XML files or documents without having to perform hard XML coding.

In the following embodiments, a single platform can be used to acquire content in one format and to transform the content in a format suitable for any number of destination devices. Furthermore, the following embodiments describe simple to use application tools for acquiring content and for creating templates to transform the content. The templates can be stored in a file or a database for later, which allows content to be edited such that other types of content can be added to provide new "look and feel" content.

In the following embodiments, syndication processing techniques are described in connection with an iTV centric environment. However, the syndication processing techniques described herein are not intended to be limited to the iTV centric environment and can easily be implemented for other types of environments, such as, for example, personal computer devices and mobile or electronic portable devices including wireless telephones, pagers, personal digital assistants (PDAs), Internet-accessible electronic devices, or other like devices.

The syndication processing techniques described herein can be implemented by a processor or central processing unit (CPU) executing code or instructions stored in a machine-readable medium. The machine-readable medium may include a mechanism that provides (i.e., stores and/or transmits) information in a form readable by a machine such a processor, computer, or a digital processing device. For example, a machine-readable medium may include a read only memory (ROM), random access memory (RAM), magnetic disk storage media, optical storage media, or flash memory devices. The code or instructions can be represented by carrier wave signals, infrared signals, digital signals, and by other like signals.

Multiple Platform Syndication
Exemplary Syndication System

Figure 1A:
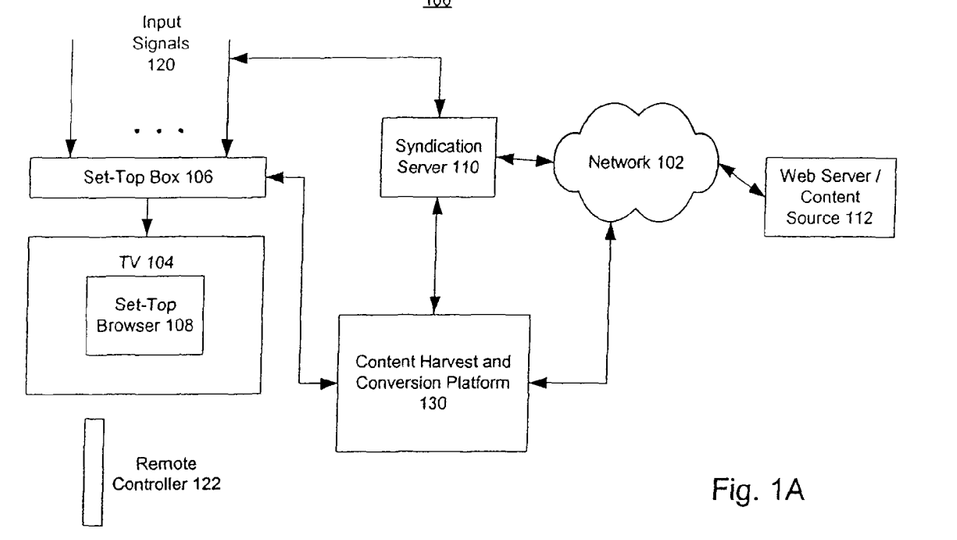
FIG. 1A illustrates an exemplary syndication system in which the present invention can be implemented.

FIG. 1A illustrates an exemplary syndication system 100 in which the present invention can be implemented. Referring to FIG. 1A, exemplary syndication system 100 includes a set-top box 106 connected to a TV 104. Set-top box 106 and TV 104 can receive inputs from a remote controller 122. TV 104 is shown to have a network 102 connection capability. That is, TV 104 can be connected to network 102 via set-top box 106. In particular, TV 104 can receive content (e.g., a web page, news information or other content) from a web server (or other content source) 112 connected to network 102. Set-top box 106 can be connected to network 102 through syndication server 110 and/or conversion harvest and conversion platform 130.

In one embodiment, network 102 is the Internet hosting the World Wide Web (WWW). The WWW allows for a uniform way of accessing information on the Internet using HTML compliant browsers. Network 102 can be other types of networks such as, for example, a local area network (LAN) or a wide area network (WAN). Network 102 can also represent wired or wireless networks. Although one web server 102 is shown in FIG. 1A, any number of web servers or other content sources can be connected to network 102. Furthermore, other types of network devices can also be connected to network 102, which can provide content for TV 104, such as, for example, a network router, bridge, gateway, or other like network devices.

Set-top box 106 is a receiver for TV 104. Set-top box receives input signals 120 (e.g., television signals) to display on TV 104. Input signals 120 can be broadcast signals from a plurality of programming sources. For example, set-top box 106 can receive broadcast signals as input signals 120 from an antenna, cable, or satellite source. Input signals 120 can be analog or digital signals. Set-top box 106 can provide on-screen displays (OSDs) or graphical user interfaces (GUIs) to facilitate interactive services, e.g., accessing content on the Internet. Further details regarding set-top box 106 are described in the '017 application.

As shown in FIG. 1A, set-top box 106 provides a set-top browser 108 such that a user of remote controller 122 can control set-top browser 108 to access a web page from a web server 102 connected to network 102. In an alternative embodiment, remote controller 122 can be replaced with an infrared (IR) keyboard.

Syndication server 110 is a processing device, which can acquire content (including news content) from a range of sources on network 102 and repackage the content for set-top box 106. Alternatively, syndication server 110 can be hardware and/or software modules operating within set-top box 106 to syndicate content from network 102 for set-top box 106. Syndication server 110 can also transform content, e.g., a web page on web server 112, to be displayable for an application, e.g., set-top browser 108, running on TV 104.

In one embodiment, syndication server 110 transforms an HTML web page and/or a news (e.g., NNTP) feed into an XML file or document ("XML file"). The XML file can be transformed for multiple types of platforms. For example, syndication server 110 can generate a standardized data stream from the XML file for display on multiple types of platforms or formats such as, for example, HTML, portable document format (PDF), Postscript, or other like formats. In one embodiment, syndication server 110 can incorporate enhanced Internet content with input signals 120 such that the enhanced content is targeted for set-top box 106. In other embodiments, syndication server 110 can transform content on network 102 and target the content for other types of devices such as, for example, a personal computer or an electronic portable device.

Content harvest and conversion platform 130 is a processing system, which can harvest content on network 102 and provide frameworks and templates for the content usable by syndication server 102. Alternatively, content harvest and conversion platform 130 can be hardware and/or software modules operating within syndication server 110 or set-top box 106 to harvest and transform content on network 102. In one embodiment, content harvest and conversion platform 130 is used to harvest and parse an HTML web page and/or a news (e.g., NNTP) feed into an XML file.

The XML file can include any number of templates with new content and media added. For example, an HTML web page is parsed, and selected tags, styles, and content can either be replaced or removed thereby creating new content from the original HTML web page. Alternatively, or in addition, the XML file may include templates to extract and reformat news (e.g., NNTP) content from a news source. Thus, if a user wants to access a particular web page on web server 112, or news data from a news source, content harvest and conversion platform 130 can have predefined templates for that web page or news source such that syndication server 110 will provide the web page/news information to set-top box 106 using the predefined templates.

For example, in the case of news information, the syndication server 110 may be responsible for inspecting the uniform resource locator (URL) of the data source and deciding which type of syndication object to create. If it detects an NNTP protocol request (usually designated by the protocol extension "news://"), syndication server 110 creates an NntpSource object, which is responsible for connecting to the news (NNTP) feed and obtaining the content. The content object is then passed on to a transformer, which is responsible for manipulating the content accordingly. Abstracting the data source type from the user interface layer in this fashion expedites the development process. Additionally, any error handling, performance tuning, etc. is implemented across all content sources easily, rather than being special cased screen by screen. The internal operation and subsystems of content harvest and conversion platform 130 will be explained in further detail below.

Remote controller 122 is a control device for a user to provide inputs (e.g., infrared (IR) or radio frequency (RF) signals) to set-top box 106 and/or TV 104. Remote controller 122 can include alphanumeric keys, options keys, functions keys, and other like keys to operate set-top box 106 or TV 104. In particular, a user can access and navigate through set-top browser 108 on TV 104 by pressing selectively certain buttons or keys on remote controller 122. Exemplary syndication system 100 can also be implemented in numerous configurations. For example, TV 104 can have the functionality of set-top box 106 contained internally. TV 104 can also be a computing device, which can display television signals. Furthermore, the functionality of syndication server 110 and content harvest platform 130 can be separate computing devices or hardware and software modules operating within set-top box 106.

Basic Syndication Operation

Figure 1B:
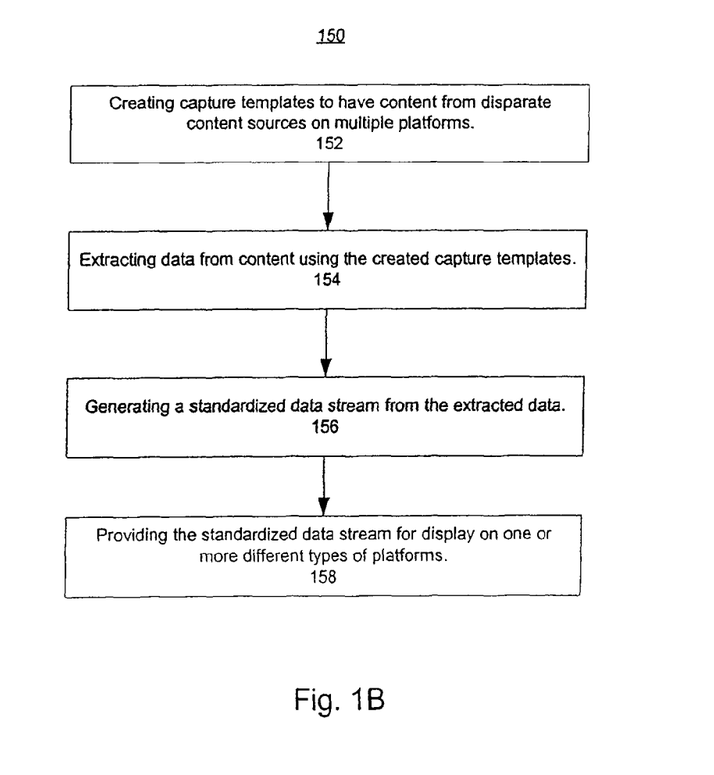
FIG. 1B illustrates a flow chart of a basic syndication operation according to one embodiment of the present invention.

FIG. 1B illustrates a flow chart of a basic syndication operation 150 according to one embodiment. Referring to FIG. 1B, operation 150, begins at operation 152.

At operation 152, capture templates are created to harvest content (e.g., news content) from disparate content sources on multiple platforms. For example, content harvest and conversion platform 130 provides the facilities and mechanisms to create capture templates and to harvest the content. The content can be from web pages on web server 112 and/or news feeds from news sources. The web page or other content can include HTML or other tags and attributes to display text and images for a personal computer display.

In one embodiment, content harvest and conversion platform 130 is used to create templates as XML files. Thus, various types of templates can be created for different types of devices because XML allows content of data to be defined in a variety of ways. In one embodiment, content and harvest conversion platform 130 can be used to create templates for a mobile device such as, for example, a wireless telephone or personal data assistant (PDA). Content and harvest conversion platform 130 can also store the templates in repositories for later use. The templates can be created that adds new content to create new "look and feel" environments as explained in detail in the '017 application.

At operation 154, data from the content is extracted using the created capture templates. For example, content harvest and conversion platform 130 can be used to extract news data from the news source.

At operation 156, a standardized data stream is generated using the extracted data. For example, content harvest and conversion platform 130 can be used to generate the standardized data stream (e.g., an XML data stream). The standardized data stream can be sent to syndication server 110.

At operation 158, the standardized data stream is provided for display on one or more different types of platforms. For example, syndication server 110 can deliver the standardized data stream to set-top box 106. Set-top box 106 can then direct the standardized data stream for display via set-top browser 108 operating on TV 104.

In one embodiment, a user can request access to a web page from web server 112 and/or news information from a news source. The request can be processed by syndication server 110. Syndication server 110 can request a standardized data stream for the web page from content harvest and conversion platform 130. Content harvest and conversion platform 130 can provide the standardized data stream to syndication server 110 using the capture templates as will be described in more detail below. Syndication server 110 can then send the standardized data stream to set-top box 106 for display. Syndication server is thus able to deliver content designed for a computer display to a TV display.

Syndication Server and Content Harvest and Conversion Platform Architecture

Figure 2A:
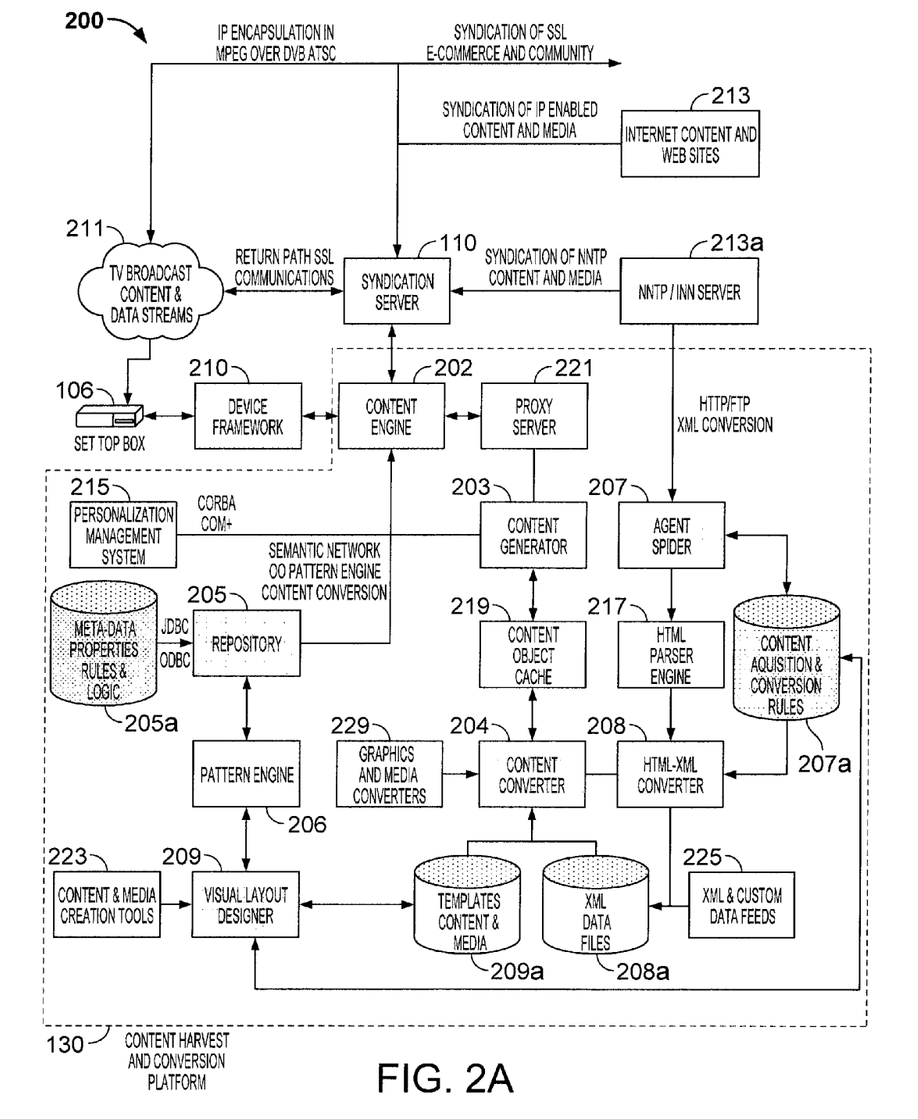
FIG. 2A illustrates a syndication server and content harvest and conversion platform architecture according to one embodiment of the present invention.

FIG. 2A illustrates a syndication server and content harvest and conversion platform architecture 200 according to one embodiment. Referring to FIG. 2A, exemplary architecture 200 provides details of the subsystems for content harvest and conversion platform 130. The subsystems can be hardware and/or software modules to transform content from one platform to be executable on multiple platforms.

Syndication server 110 is responsible for the overall management of the system within exemplary architecture 200. In particular, syndication server 110 controls content flow to set-top box 106. Syndication server 110 can also control content flow to other types of devices, e.g., a PDA or a wireless telephone. Syndication server 110 can also coordinate client requests, content delivery, and commerce transactions that may be initiated, e.g., by a user of TV 104. Syndication server 110 interfaces with TV broadcast content and data streams 211. TV broadcast and data streams 211 provide feeds into set-top box 106 for TV 104. TV 104 can be a TV system supporting analog, Digital Video Broadcasting (DVB), Advanced Television Systems Committee (ATSC), or other well known TV standards. In one embodiment, syndication server 110 can inject Internet Protocol (IP) based data into TV broadcast content and data streams 211 going to set-top box 106. For example, syndication server 110 can combine Internet content with TV broadcast content and data streams 211 using the Advanced Television Enhancement Forum (ATVEF) standard. ATVEF is standard to provide web-based content in a TV broadcast.

Syndication server 110 also interfaces with Internet content web sites 213 and news servers 213a, which can be accessible by standard compliant browsers. Syndication server 110 can combine the ability to broadcast content and the ability to request content to create new personalized experiences. For example, syndication server 110 can add new content to a web page and/or news feed being sent to set-top box 106. That is, syndication server 110 can retrieve harvested content and combine a variety of new content types with the data broadcast to provide a "new look and feel" to the content. Syndication server 110 uses content engine 202 to create synthesized content. Syndication server 110 can target the synthesized content for various types of platforms, devices, and audiences.

Syndication server 110 can perform syndication on-the-fly in response to a user's request of TV 104. Syndication server 110 can also be programmed to perform scheduled syndication of content to the user. In one embodiment, syndication server 110 is to operate using Java Script Pages (JSP), Java and Enterprise Java Beans (EJB) to convert standardized content data stream to other optimized formats for various types of platforms, devices, and audiences. In another embodiment, syndication server 110 is to operate using an open standard, which includes the XML standard. In other embodiments, syndication server 110 is to operate using standard XML applications, which include Extensible Style Sheet Language Transformation (XSLT), XML path language (XPATH), World Wide Web Consortium (W3C) Document Object Model (DOM) Application Program Interface (API), or other like standards. Such XML applications will be described in further detail below. Furthermore, all syndication modules within syndication server 110 can be packaged as enterprise java beans (EJB), which allows the modules to run within an EJB compliant application servers. An EJB compliant application server provides an architecture for the development and deployment of distributed object systems for the Java platform. Applications written using the EJB architecture are scalable, transactional, and multi-user secure.

Content engine 202 is responsible for creating and delivering content and media assets to device framework 210. Content engine 210 uses a repository 205 storing meta data properties, rules, and logic 205a and content generator 203 via proxy server 221 to provide a dynamic and compelling targeted service to set-top box 106 or for other devices. Content engine 202 can provide a service that is easy to update and change. Content engine 202 manages localization and personalization of content and media assets for geographic and demographic targeting. In one embodiment, content engine 202 leverages existing algorithms for collaborative filtering and personalization by exposing meta data, properties, rules, and logic 205a in repository 205 with external personalization management system 215.

Content engine 202 dynamically composes content, scripts, and media for syndication server 110. Content engine 202 can also generate code or instructions, which are industry standard compliant, to exploit specific platforms and devices. For example, content engine 202 can convert an HTML web page and/or an NNTP news feed into an XML file. Content engine 202 can use extensive routines and libraries provided by device framework 210 to deliver a highly scalable environment. Content engine 202 can be used to customize the content for geographic and demographic integration into the data broadcast, which provides instant, responsive, and compelling experiences for the end user.

Content generator 203 is responsible for producing well formed HTML, XML, JavaScript, Java, custom code and other media formats for targeting content to specific platforms and devices. Content generator 203 uses meta data, properties, rules, and logic 205a with templates, content, and media 209a and XML data files 208a to generate content for delivery to content engine 202. Content generator 203 uses content converter 204 and content acquisition system ("Agent Spider") 207 to locate, harvest, convert and deliver existing Internet content for new interactive services. For example, the Internet content can be HTTP, file transfer protocol (FTP), news (NNTP), or XML content, which is to be converted. In one embodiment, the Internet content is to be converted to an XML file.

Content generator 203 uses templates, content, and media 209a and repository 205 storing meta data, properties, rules, and logic 205a to resolve object properties and design information. The meta data drives the generation process to be highly targeted and adapted for specific devices and users. Content generator 203 can use an external content object cache 219 to optimize the delivery of previously composed and loaded content. Content object cache 219 is loaded dynamically and optimized to combine broadcasted content.

Content Converter 204 is responsible for transforming, e.g., XML data files 208a or other type of media, to new formats using templates, content, and media 209a.

Content converter 204 manages and coordinates existing conversion tools and libraries to transform content. The templates and conversion rules are stored as templates, content, and media 209a that is populated by the visual layout designer 209. A user can operate visual layout designer 209 to create templates to describe how content should be laid out and what interface model and logic should be applied. XML data files 208a are used to access service data and information that is combined with media, content, and script files. Each XML file type and content type are tagged with meta data to allow for fine tuned delivery of specific versions, file sizes, color depths, visual style, and audio quality. In one embodiment, content converter 203 transforms assets dynamically (with caching). In another embodiment, content converter 203 can be scheduled in a batch mode other types of services.

Repository 205 is a semantic network based data store of all objects and properties of the overall content syndication system 200. Repository 205 can be one or more memory devices (e.g., a fixed disk) to store a database of meta data, repositories, rules, and logic 205a. In one embodiment, repository 205 uses an object, fact and value based meta data model to store meta data information about design objects and properties. In one embodiment, repository 205 provides data to allow a semantic network based approach with a flexible verb table driven meta model, which allows any information to be captured, versioned, catalogued, indexed and queried. Repository 205 can store screen designs, templates, business logic and conversion rules for content delivery to a variety of execution environments.

Repository 205 can use a database to store meta data, properties, rules, and logic 209a. Repository 205 can be used to provide a lazy on demand loading ability to load an object's facts and properties. Repository 205 has the ability to store variants, stacked configurations, and language filtering to make storage of multiple versions of applications and content to be cost effective and very efficient. Repository 205 uses pattern engine 206 to provide projected views of the meta data to allow resolution of facts for composing object containments, collaborations, and properties. Pattern engine 206 is used to fully resolve across platform types, variants and locales and provides an elegant way to store and view multiple versions of the same service.

Pattern Engine 206 is tightly integrated with the repository 205, but requires special attention as it provides the algorithm and meta model to enable large-scale reuse of complete architectures, interface models, and personalization logic from existing designs. Pattern engine 206 takes into account existing proven system architectures and pre-build components and applies domain and platform specific modifications to create dynamic, customized version of each interactive service. Pattern engine 206 is used by repository 206 to provide "projections" of the design information for a specific configuration. Pattern engine 206 uses advanced object oriented inheritance and semantic network taxonomy algorithms to provide an easy to use abstraction of the service for professional creative and business users.

Agent Spider 207 is responsible for rapidly accessing content, media and programming from existing Internet content and web sites 213. Agent spider 207 is able to understand the structure of a web site or other content source, and relevant web pages or other feeds on any site and harvest the content from the site. Agent spider 207 can be used to schedule periodic batch runs or accessed in real time to satisfy client requests for content. Agent spider 207 stores content acquisition and conversion rules in a repository 207a and employs advanced algorithms to navigate a web site's structure and locate a particular uniform resource instruction (URI) to extract information, content and media assets without any changes to existing web sites and pages.

Agent spider 207 accesses content using Internet standard protocols such as HTTP/HTTPS/FTP/NNTP and other platform specific APIs. Agent spider 207 uses a conventional parser engine 217 to read and transform the structure and content of any given page or other content source. The content acquisition subsystem of the agent spider is flexible and new acquisition modules can be easily plugged in. Agent spider 207 is able to locate, acquire and convert content dynamically in real time in a highly scalable manner. Agent spider 207 is capable of advanced agent behavior including responding to events, site changes and transactions from existing sources. Agent spider 207 is able to acquire content that requires security and authorization including secure sockets layer (SSL).

HTML converter 208 converts existing HTML type content into clean well-formed documents (xHTML) for conversion into XML service specific schemas and data files. An XML schema offers an XML centric means to constrain XML documents. The conversion logic and process is stored in a content acquisition and conversion rules repository 207a. HTML converter 208 creates XML data files 208a based on the conversion rules in the repository and creates XML data files and streams that are used by content converter 204 and content generator 203 subsystems to create dynamically content for specific platforms and device frameworks. The XML files created represent the data and properties of any service and are used to generate the user interface, interaction model and view of the service. HTML converter 208 is also responsible for converting other XML and other custom content data feeds from a variety of sources. HTML converter 208 is designed to be extended using a plug in architecture for adding on new conversion modules. HTML converter 208 is responsible for language, encoding and XML document type destination (DTD) conversion. HTML converter 208 allows custom code and routines to be used to parse and convert HTML and XML files.

Visual layout designer 209 is responsible for providing the user interface for creative professionals and business users to rapidly layout and customize rich interactive services. Visual layout designer 209 is used to provide a drag and drop environment for defining and creating the content transformation and mapping rules. Visual layout designer 209 uses a "content wizard" to guide the user through all of the relevant steps of setting up a syndication "channel." The syndication content acquisition and conversion rules 207a are stored in a separate repository for access during the syndication process. Visual layout designer allows users to configure specific platform and language properties to create custom, platform specific services. Existing industry standard data types and content creation tools 223 can be used in the process to combine and layout content and designs for new interactive services. Visual layout designer 209 uses pattern engine 209 and repository 205 to read, query and store design information about the screens, templates and user interaction model. The design information is stored in both repository database 205a and the template and content repository database 209a.

Visual layout designer 209 uses such repositories to show designers specific variants of the design visually and enable them to easily design, layout and create multiple platform and language versions of their service. Visual layout designer 209 allows developers to rapidly integrated existing and new content to create rich new services targeted at a variety of platforms and devices. Visual layout designer 209 generates meta data information that is stored in the design 205a and conversion 207a repositories.

Device framework 210 is responsible for managing the client side components and logic to provide a rich compelling interactive user experience. In one embodiment, device framework 201 is a module within set-top box 106. In another embodiment, device framework 201 is a module within content harvest and conversion platform 130. Device framework 210 include routines and components for exploiting the platform application program interfaces (APIs), playing specific media types and enabling seamless user interaction models. Device framework 210 uses a proprietary cross platform method to enable content and services to run on any device capable for Internet standard protocols including ATVEF compliant receivers. Device framework 210 requests information and services from content engine 202 and executes the content on the device. Device framework 210 comprises of a rich set of object models and components that work across multiple platforms that abstract the core functionality required on every device.

Device framework 210 manages and controls the user experience including navigation, security and interaction models. Device framework 210 includes the ability to change dynamically the appearance of the interface providing highly customized look and feel. Device framework 210 manages the network connection for the device and control caching as well as peripheral devices. Device framework 210 includes components to exploit specific platforms and enable rich end user experiences for any device including set-top box 106. In one embodiment, set-top box 106 is an ATVEF compliant receiver or an advanced set-top box to deliver interactive and enhanced content.

Figure 2B:
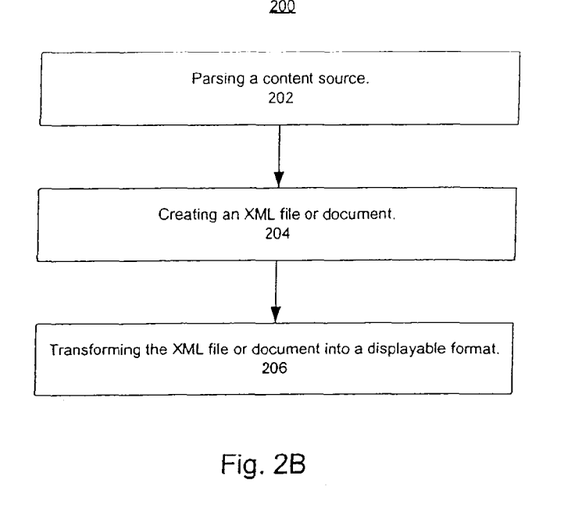
FIG. 2B illustrates a flow chart of processing an HTML page according to one embodiment of the present invention.

FIG. 2B illustrates a flow chart of an operation 200 for processing an HTML web page. The same sequence of operations is applicable to any content source (e.g., a news content source). For purposes of explanation, operation 200 is performed by the subsystems of content harvest and conversion platform 130 and operation 200 begins at operation 202.

At operation 202, an HTML web page is parsed. For example, HTML parser engine 217 can parse an HTML web page from Internet content and web sites 213. In one embodiment, selected tags, styles, and content are either replaced or removed from the HTML page. Such a modification can be displayed in a browser to see the changes.

At operation 204, an XML file is created from the parsed HTML web page. For example, HTML-XML converter 208 can be used to convert the parsed HTML web page from parser engine 217 into an XML file which can be stored in XML data files 208a.

At operation 206, the XML file or document can be transformed into a displayable format. For example, content converter 204 and content generator 203 can be used together to transform an XML file stored in XML data files 208a. In one embodiment, an XML file is transformed into an HTML web page. An extensible style sheet transformation (XSLT) application can be used to perform such a transformation.

An XSL application transforms and translates XML data from one format into another. Thus, an XSL applications allows an XML file to be displayed in an HTML, PDR, Postscript or other like formats. That is, without an XSL application, the XML document would have to be manually duplicated, and then converted into each of separate format. Instead, an XSL application provides a mechanism of defining style sheets to accomplish these types of tasks. In particular, rather than having to change the data because of a different representation, an XSL application provides a complete separation of data, content, and presentation. Specifically, an XSL application is used to map an XML file into another representation. Using XSL is thus comparable to writing a Java program to translate data into, e.g., a PDF or HTML document, but supplies a standard interface to accomplish such a task.

In one embodiment, such a transformation can either occur within content harvest and conversion platform 130, syndication server 110, or even in set-top box 106. In other embodiments, the XML file can be transformed into another XML file. Alternatively, the XML file does not have to be transformed but can include an HTML page with special links.

Syndication Server

Figure 3:
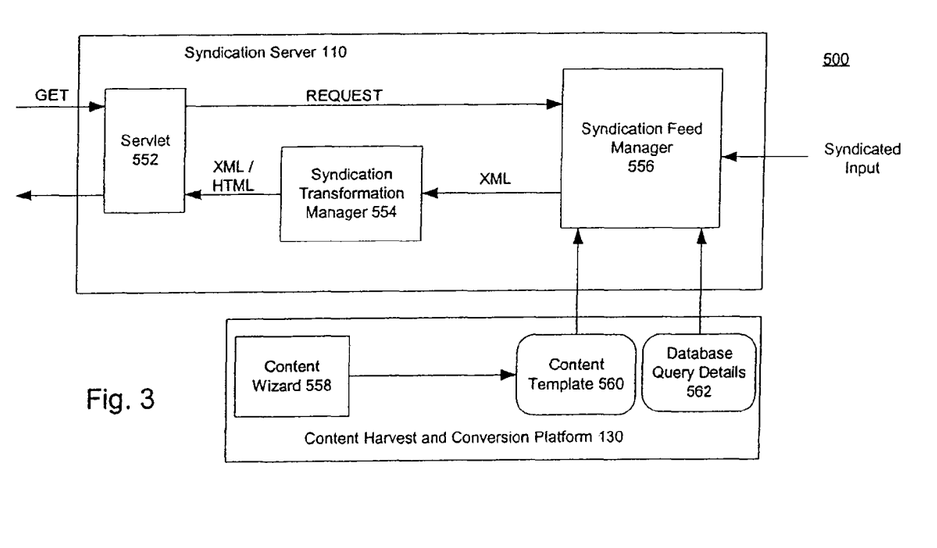
FIG. 3 illustrates a block diagram of the internal components of the syndication server interacting with components of the content harvest and conversion platform according to one embodiment of the present invention.

FIG. 3 illustrates a block diagram of the syndication server 110 interacting with components of content harvest and conversion platform 130. Referring to FIG. 3, syndication server 110 includes servlet 552, syndication transformation manager 554, and syndication feed manager 556. In one embodiment, content wizard 558, content template 560, and database query details 562 can be components within content harvest and conversion platform 130. Content wizard 558 and visual layout designer 209 in FIG. 2A can represent the same application.

Syndication Feed Manager

Syndication feed manager 556 can be hardware and/or software modules to receive syndicated input. The syndicated input is a syndication feed that is a source of syndication data such as, for example, a web page, news content, XML file, XML data stream, or other like data streams. Syndication feed manager 556 pipes the syndicated data into syndication server 110. In one embodiment, if the syndication input is a web page, content template 560 is used to direct syndication feed manager 556 to the parts of the web page that are of interest. Content template 560 formats the parts into an XML file for output. Similarly, if the syndication input is a news feed, content template 560 is used to direct syndication feed manager 556 to the parts of the news feed that are of interest. Content template 560 formats the parts into an XML file for output.

In one embodiment, syndication feed manager 556 is wrapped by a java bean to expose the Document Object Model (DOM) of the XML output as an Application Program Interface (API). A DOM provides a means of manipulating data for an XML file or document. The DOM provides a representation of an XML file or document as a tree, to provide easy manipulation and alteration. A java bean is a program component which can be executed by a client. Thus, syndication feed manager 556 may be embedded into servlet 552, Java Server Pages (JSP), or Application Server Pages (ASP). A JSP is used to control the content or appearance of web pages through the use of a servlet, which is a small program that is specified in the web page and run on the web server to modify the web page. An ASP is an HTML page that includes one or more scripts (small embedded programs) that are processed by a web server before the page is sent to the user.

Web Page Content Wizard

Content wizard 558 is an authoring application tool to create templates for use by syndication feed manager 556. In other embodiments, syndication feed manager 556 or syndication transformation manager 554 can act as an authoring application tool. To create templates, content wizard 558 allows content to be marked up and mapped to a template for use by syndication feed manager 556. Content wizard 558 starts with a data source (e.g., a web page, news feed, etc.) selected by a user and displays the content source with its structure (e.g., html structure in the case of a web page) revealed. The user can select content such as, for example, "the second paragraph" or the "table2, row 3, cell 4" and label it for inclusion into a separate template.

A capture template is thus built as the user progresses, starting with a root node that references the user selected content source, and progressing to sub nodes that reference user selected content within the content source, and further to other content sources that may be referenced from the root node, or even sources that are not physically linked to the root, but whose content is relevant. The labels applied to the separate areas of content are meaningful human readable names, and are used in other areas of the design process. In one embodiment, the content template is an XML file. An exemplary XML file is shown below.

```
<NEWSTEMPLATE3       URL="www.meganews.con-iltoday/headlines.html>
  <STORY1>
  <HEADLINE          CONTENT ="table2,row*,column1"\>
  <DETAILURL         CONTENT = "table2,row*,column1"\>
  <DETAILS           URL=DETAILURL CONTENT="paragraph2"\>
  <IMAGE             URL= DETAILURL CONTENT="image3"\>
  <STORY1\>
<NEWSTEMPLATE3\>
```

The template may also include macros and regular expressions to further refine content extraction. Content wizard 558 can capture repeating patterns, such as a list of products, and can navigate across content sources. Content wizard 558 also allows rules to be specified, e.g., what action to take should some user content be missing or empty.

In other embodiments, Content wizard 558 can be used to create a template using a DTD file or Xschema file. However, this creates just the entity names without the links specifying where the content came from. Content wizard 558 may then be used to load templates and fill in the links. The authoring operation of creating templates using content wizard 558 will be explained in further detail below.

Syndication Transformation Manager

Syndication transformation manager 554 accepts an XML stream or file output by syndication feed manager 556 and transforms the XML stream or file for display by set-top box 106. Syndication transformation manager 554 may output the XML file as HTML web page. Alternatively, syndication manager 554 may output the XML file as another type of XML file having different XML data from syndication feed manager 556.

In one embodiment, syndication transformation manager 554 performs the transformation using an XSLT application. XSLT is a text-based transformation in which XML data is merged with an Extensible Style Sheet Language (XSL). In one embodiment, an application such as RadTV Designer can be used to perform the XSLT transformation In another embodiment, a text editor such as a word processing application can be used to perform the SLT transformation. Syndication transformation manager 554 can use modules coded in java or java script and plugged in on the client side to perform such a transformation.

In one embodiment, chained transformers are used to manipulate the news content in a sequenced chain of transformations. For example, this manipulation can occur at two levels:
  Standardized manipulation for all news (e.g., NNTP) content—transformers within syndication server 110 are used as a basic means of data manipulation to be applied to all news (e.g., NNTP) content. Such manipulations may include:
    Removal of duplicate messages.
    Sorting of messages by date.
    Removal of duplicate headlines (this may be considered as a special case of removing duplicate messages because headlines may be considered messages).
    Headlines with media references (e.g., Images, Audio, and Video) are given priority.
    Ability to grab a specified number of messages (n).
    Ability to retrieve messages that match a specified pattern.
    Parsing of tabular based data such as sports standings.
    Reformatting of dates into a common format.
    Extra XML elements are made available.
  Customized manipulation for unique feeds—by specifying a transformer plug-in, additional transformers can be chained to the base transformers to further manipulate any customized news (e.g., NNTP) feed.

Servlet 552 is software component or small program that runs within syndication server 110. Servlet 552 is invoked after receiving XML or HTML data from syndication transformation manager 554 or after receiving a "GET" request from set-top box 106. The "GET" request can be for a specific content source.

Syndication Caching

Figure 4:
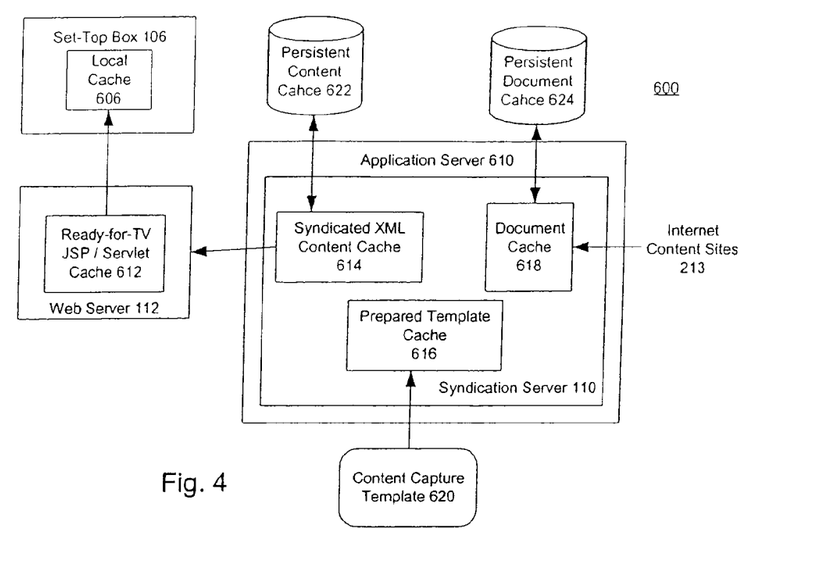
FIG. 4 illustrates a block diagram of caching within a syndication system according to one embodiment of the present invention.

FIG. 4 illustrates a block diagram 600 to show syndication caching according to one embodiment of the present invention. Referring to FIG. 4, block diagram 600 includes a set-top box 106 having a local cache 606, web server 612 having a ready-forTV JSP/Servlet cache 612, and syndication server 110 having a syndicated document cache 618 to receive content from Internet sources 213, prepared template cache 616 for storing content capture templates 620, and a syndicated XML content cache 614. Syndication server 110 can operate within an application server 610.

The caches shown in diagram 600 can be any type of memory devices. Such memory devices can include random access memory (RAM) devices, dynamic random access memory (DRAM) devices, flash memory devices, or other like memory devices. The caches can be controlled using any number of memory management methods, e.g., a Most Recently Used (MRU) method can be used to remove old data from the caches.

Local cache 606 for set-top box 106 may store pre-loaded content in anticipation of a scheduled television program such as a commercial. Syndication server 110 can coordinate with set-top box 106 to output cached contents to a user. Ready-for-TV JSP/Servlet cache 612 caches content, e.g., web pages, JSPs, etc., that are formatted for a particular device such as TV 104. In one embodiment, the contents of cache 612 can be delivered to other web servers. This cache is useful if many users request the same information at the same time.

Syndicated XML content cache 614 caches the XML DOMs that are the result of syndication. Syndicated XML content cache 614 is useful if more than one JSP, ASP, servlet or other technology that converts XML content into a TV web page and makes use of a single XML capture template. This happens if there are many instances of a servlet/JSP accessing a single XML file concurrently, or there are many different TV page designs for displaying the same type of content, e.g., weather or news content. Syndicated XML content cache 614 may obtain data from more than one web page.

Document cache 618 caches information (e.g., news feeds, web pages, etc.) retrieved from syndicated sites. This cache is useful if more than one capture template gets content from a single web page. Prepared template cache 616 caches capture templates after they have been prepared for use. This cache is useful whenever the syndicated content needs to be refreshed from the source. In one embodiment, the contents of the various caches can be stored in persistent data storage devices such as, for example, a fixed disk. Shown in the illustration are persistent content cache 622 for storing items from syndicated XML content cache 614, and persistent document cache 624 for storing documents from document cache 618.

The caching provided in diagram 600 is useful in the event of a failure to syndication server 110. That is, stale cached data can be provided instead of providing no data. For example, if content related to a weather report was cached two hours ago, the same cached content can still be provided as the "latest forecast." Similarly, syndication server 110 may retrieve cached news data in instances where the data source (news server) is not available. In an iTV environment, the ability to continue to provide content to subscribers is crucial as subscribers are less familiar with (and forgiving of) downtime in a television environment that in the Internet environment. The concept of "rebooting" a television does not exist in the mind of most consumers. Caching also improves performance by preventing unnecessary requests to the news (NNTP) provider. Performance in an iTV environment is also crucial as viewers are accustomed to instantaneous media delivery.

A request from a client (usually a JSP) will first hit the content cache 614. A request to the syndication server 110 usually specifies the name of a capture template or a dialog file, and optionally a -CTRL, and these two values form the cache keys, or optionally, can be used as input to a syndication server extension program that supplies the cache keys. If the syndication server 110 does not find current data responsive to the request in the content cache 614, it will hit the persistent content cache 622. If no content exists in the persistent content cache 622, then syndication server 110 will access the document cache 618, followed by the persistent document cache 624. If current data is not found in either of these caches, data will be obtained from the syndication source 213. Of course, other chains of hierarchical caching schemes may be used, as appropriate to the installation and request circumstance.

Items in both the content cache 614 and the document cache 618 can be written to their respective persistent caches 622 and 624. The persistent caches have three purposes:

- They can usually hold many more items than memory cache.
- If syndication fails (perhaps due to a network error or change in the NNTP data feed), old content can be retrieved from persistent cache (eg., to give the illusion of continual availability to the viewer).
- In a clustered environment, all processors in the cluster can share the same (or several) persistent cache(s), so that content retrieved by one processor can be utilized by other processors.

A MaxAgeInCache attribute may specify a time (usually a number of seconds) the syndicated content is to be cached. A MaxAgeContentUsable attribute may specify a maximum amount of time that content in the persistent caches can be used. If the syndication server 110 finds that data in cache is expired and then fails in its attempt to obtain new content, the content from persistent cache can be used if the MaxAgeContentUsable has not expired. If content from a persistent cache is used, it is only cached in memory for a brief period of time (e.g., one minute). Afterwards, an attempt to obtain new content is made, and continues periodically thereafter (e.g., once a minute) until successful.

Items in persistent cache may be stored in a directory hierarchy under a root directory. A modified date on each file may be set to a time corresponding to a condition when the content finally becomes unusable. Persistent cache files and directories can be deleted to clear the cache. For example, a background thread may periodically (e.g., once per hour or so) run a cleanup process on persistent cache files and delete files whose modified date is expire.

Content Acquisition and Transformation

Web Page Content Wizard/Visual Layout Designer

Figure 5:
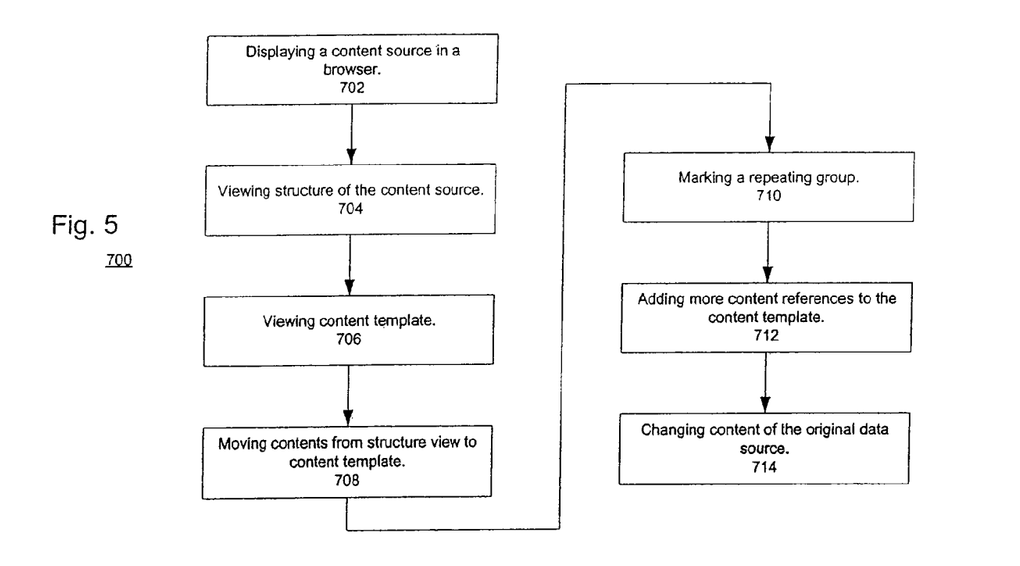
FIG. 5 illustrates a flow chart of an operation to create a template according to one embodiment of the present invention.

FIG. 5 illustrates an operation 700 of using a content application authoring tool according to one embodiment. In one embodiment, the content application authoring tool is visual layout designer 209 as described with reference to FIG. 2A. In another embodiment, the content application authoring tool is the content wizard 558 as described with reference to FIG. 3. Content wizard 558 can include a number of application tools operating together. For purposes of explanation, operation 700 refers to content wizard 558. Initially, operation 700 begins at operation 702.

At operation 702, a content source is displayed in a browser. At operation 704, the structure of the content source (if applicable) is viewed. For example, a web page content source may have a tree structure titled as "xyzmens.xml." In one embodiment, the tree structure is shown along the web page. By viewing the tree structure, attributes of the HTML tree structure can be filtered out.

At operation 706, a content template is viewed, for example, a web page content template for an XML file. The XML file can be titled as "template.xml." The web page content template can be viewed alongside the HTML tree structure.

At operation 708, content references from content source are input (e.g., via a mouse drag operation) into the content template. It should be noted that what has been captured in the content template is the location of the objects and not the object.

At operation 710, a group that is repeating is marked (if applicable). For example, a repeating table can be marked as such.

At operation 712, more content references may be added to the content template if so desired. At operation 714, content of the original content source may be changed if desired. Thus, by using the content authoring application tool the original content can be altered to provide a new "look and feel." Such a new look and feel can be optimized for a TV centric environment in which items and categories are optimized for display on a TV screen. Further processing can also be performed. For example, in one option, the content template can be modified to capture only categories and to create a new content template for each source that lists items. In another option, the content template can be modified, so as not to define the list of categories as a repeating group. Further details of web page and other content capturing are described in detail in the '017 application.

Defining XML Documents

XML files or documents that are created can be used by content harvest and conversion platform 130 and syndication server 110 and can be defined for specific types of applications and audiences using document type definitions (DTDs). A DTD establishes a set of constraints for an XML file or document. That is, a DTD defines the way an XML document should be constructed. For example, content related to different types of services (e.g., news, weather, traffic, stock, etc.) may have different types of DTDs.

In one embodiment, content harvest and conversion platform 130 and syndication server 110 can use default DTDs for different types of services being provided. In particular, an industry standard DTD can be used as a baseline. The following are exemplary namespaces, which can be used for services providing news, weather, traffic, or stock content:

http://www.metatv.com/svc/weather http://www.metatv.com/svc/traffic http://www.metatv.com/svc/stock http://www.metatv.com/svc/news A namespace is a mapping between an element prefix and a URI. This mapping is used for handling namespace collisions and defining data structures that allow parsers to handle collisions.

News Example

The industry standard DTD for news is News Industry Text Format (NITF), which can be found at http://www.iptc.org/iptc/. A DTD that is a subset of nitf may be found at http://www.xmlnews.org/. In one embodiment, the xmlnews.org DTD (xmlnews-story.dtd) is used. Xmlnewsorg also has meta definitions to describe news content (xmlnews-meta.dtd), which can also be used. These DTD's are designed for news articles. An exemplary XML file with a news DTD is shown in Table 1 below.

TABLE 1

```
<?xml version="1.0" ?>
 <news xmlas="http://www.metatv.com/svcinews"
xmlns:xn="http://www.xmlnews.orginamespaces/meta#"
xmlns:ctl="littp://www.metatv.comictl">
 <headline>
 <hedline> <hl1>Search Resumes at Ski Resort</b11>
 </hedline>
 <byline>By IAN PHILIIPS Associated Press Writer</byline>
- <dateline>
 <location>CHAMONIX, France<location>
 <story.date>Monday January 25 1999 7:28 ET</story.date>
 </dateline> </headline>
 <headline>
 <hedline> <h11>German Union Hopes To Avoid Strike<1111>
 <hedline>
```

Another exemplary XML file with a news DTD is shown in Table 2 below.

TABLE 2

```
<?xml version="1.0" ?>
:<nitf xmlns:etl="http://www.metatv.comictr>
z <xn:Resource xmlns:xn="http://www.xmlnews.orginamespaces/metair>
<xn:title>143
Dead in Colombia Earthquake</xn:title>
<xn:creator>Jared Kotler</xn:creator>
<xn:dateline>Bogota, Colombia, Monday January 25 1999 7:28
ET</xn:dateline>
<xn:language>en</xn:language>
</xn:Resource> - <head>
<title>143 Dead in Colombia Earthquake</title>
</head>
- <body>
<body.head> - <hedline>
<hll>143 Dead in Colombia Earthquake</h11>
</hedline> z <byline>
<bytag>By Jared Kotler, Associated Press Writer</bytag>
</byline>
- <dateline>
<location>Bogota, Colombia</location>
<story.date>Monday January 25 1999 7:28 ET</story.date>
</dateline>
</body.head>
z <body.content>
<p>An earthquake struck western Colombia on Monday,
killing at least 143 people and injuring more than 900 as it
toppled buildings across the country's coffee-growing
heartland, civil defense officials said.</p>
```

Thus, a method and system for transforming news content for execution on multiple platforms have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

The invention claimed is:

1. A method, comprising:
storing, by a computer, a target platform specific web content harvest capture template comprising one or more markup language files defining rules, logic and content extraction parameters for media content, and identifying content display layouts or mappings for the target platform;
using the capture template to extract media content from one or more web-based sources; and
providing the media content to a targeted platform device.

2. The method of claim 1, wherein the capture template is author-defined.

3. The method of claim 1, further comprising:
generating a normalized data stream optimized for display on the targeted platform based on the capture template.

4. The method of claim 1, wherein using the capture template to extract media content further comprises extracting media content from a plurality of disparate, web-based content sources.

5. The method of claim 1, further comprising performing a plurality of chained transformations on the extracted media content.

6. The method of claim 5, further comprising specifying one or more chained transformer plug-ins to customize a content feed.

7. The method of claim 1, wherein the one or more markup language files are extensible markup language files.

8. A non-transitory computer-readable medium, storing instructions that, when executed by a computing device, cause the following to occur:
storing, by a computer, a target platform specific web content harvest capture template comprising one or more markup language files defining rules, logic and content extraction parameters for media content, and identifying content display layouts or mappings for the target platform;
using the capture template to extract media content from one or more web-based sources; and
providing the media content to a targeted platform device.

9. The non-transitory computer-readable medium of claim 8, wherein the capture template is author-defined.

10. The non-transitory computer-readable medium of claim 8, the instructions further causing the following to occur when executed:
generating a normalized data stream optimized for display on the targeted platform based on the capture template.

11. The non-transitory computer-readable medium of claim 8, wherein using the capture template to extract media content further comprises extracting media content from a plurality of disparate, web-based content sources.

12. The non-transitory computer-readable medium of claim 8, the instructions further causing the following to occur when executed:
performing a plurality of chained transformations on the extracted media content.

13. The non-transitory computer-readable medium of claim 12, the instructions further causing the following to occur when executed:
specifying one or more chained transformer plug-ins to customize a content feed.

14. The non-transitory computer-readable medium of claim 8, wherein the one or more markup language files are extensible markup language files.

15. A system, comprising:
a content harvest and conversion platform, configured to allow authors to create capture templates including one or more markup language files defining rules, logic and content extraction parameters for harvesting media content from disparate, web-based sources, the harvest and conversion platform being further configured to use the capture templates to extract media content from the web-based sources; and
a syndication server configured to generate a normalized data stream from the extracted media content, and to provide the normalized stream for display on one or more different platforms.

16. The system of claim 15, wherein the content harvest and conversion platform is configured to perform a plurality of chained transformations on the extracted media content.

17. The system of claim 16, wherein the content harvest and conversion platform is configured to specify one or more chained transformer plug-ins to customize a content feed.

18. The system of claim 16, wherein the content harvest and conversion platform is configured to perform the plurality of chained transformations on the extracted media content to customize a news feed for a user.

19. The system of claim 18, wherein the customizing of the news feed for the user includes removal of duplicate news headlines.

20. The system of claim 15, wherein the markup language files include one or more extensible markup language files.

* * * * *